United States Patent [19]
Reid et al.

[11] 4,161,210
[45] Jul. 17, 1979

[54] TEMPERATURE INCREASE SYSTEM

[76] Inventors: Allen F. Reid, 10 Melody La., Geneseo, N.Y. 14454; Albert H. Halff, 3636 Lemmon Ave., Dallas, Tex. 75219

[21] Appl. No.: 540,214

[22] Filed: Jan. 10, 1975

[51] Int. Cl.² ............................................ F28D 15/00
[52] U.S. Cl. ........................................ 165/1; 60/641; 62/4; 126/263; 165/107 R; 165/DIG. 17
[58] Field of Search .............. 62/4; 126/263; 165/107, 165/2, 1, DIG. 17

[56] References Cited
U.S. PATENT DOCUMENTS

| | | | |
|---|---|---|---|
| 3,075,361 | 1/1963 | Lindberg, Jr. | 62/4 |
| 3,198,710 | 8/1965 | Long | 62/4 X |

OTHER PUBLICATIONS

McKisson, R. L., *Dissociation-Cooling*, Livermore Research Lab., USAEC (LRL-86), 3/1954, p. 20.

*Primary Examiner*—Leland A. Sebastian
*Attorney, Agent, or Firm*—Wilkie, Jr., Alexander C.

[57] ABSTRACT

The process accumulates heat from a relatively low temperature source to support an endothermic chemical reaction, partially separates the products of the reaction from the reactants, and then releases the accumulated heat in the reverse exothermic chemical reaction at a higher temperature simultaneously restoring the original chemical composition. The forward and reverse chemical reactions are slow enough to prevent substantial reaction during the separation and transfer of the chemicals, but they may be speeded by catalysts within the reaction chambers. The chemicals are separated by standard procedures such as sorption-desorption, distillation, freezing and melting, precipitation, extraction, centrifugation, and reactions with other materials.

10 Claims, 4 Drawing Figures

TEMPERATURE INCREASE SYSTEM

BACKGROUND OF THE INVENTION

The heat in industrial hot water or low pressure steam is frequently waste heat, since it cannot be efficiently utilized for heating, drying or chemical processes, or to produce mechanical or electrical energy. As well as being useless at the site of production, such hot water or water heated by the steam may pose a disposal problem, since direct flow into many streams or other bodies of water may provide thermal pollution.

The process described here may be used to concentrate a significant amount of this heat into water or steam, bringing it to a higher temperature, thus providing a source of useful heat and reducing the fuel requirements and heat disposal provisions for an industrial process. There are other systems, such as heat pumps, which can raise the temperature of some water while lowering the temperature of other water, but such systems require an input of mechanical energy or higher temperature heat; whereas the process here described requires only sufficient outside energy to transfer materials through the system and to instrument and control the transfers.

The process uses the exothermic conversion of substances A to substances B in a reaction chamber. The heat liberated in this conversion is added, via heat exchange, to a portion of the influent hot water, producing water at a higher temperature or steam which can be used as a source of useful energy. The substances B are separated from the mixture and, in another reaction chamber, converted back to A, absorbing heat which is furnished by another portion of the influent hot water. The net result of these steps is that a stream of hot water is separated into two streams, one hotter than the original stream, and one cooler.

In order for the described system to work, several conditions are necessary:

(1) In addition to the influent hot water, there must be at least one cooler influent stream (e.g. water or air) which gains heat from the process in such a way that the second law of thermodynamics is not challenged. In an isolated system, division of a body of intermediate temperature into a warmer body and a cooler body is attended by a decrease in entropy which is not permitted by the second law; but adequate heating of a still cooler body within the system can satisfy the law.

(2) At temperatures which may be held by available influent fluids, the equilibrium concentrations of both A and B substances in the reaction mixture must be substantial.

(3) A to B reaction speeds must be slow enough so that a minimum of reaction occurs during separation of B from A and during transfer to and from the reaction chambers; and A to B reaction speeds within the reaction chambers must be fast enough so that heat is released rapidly enough or absorbed rapidly enough to make the process practical. One method of accomplishing this is to utilize a normally slow reaction and to provide catalyst to speed the reaction in the reaction chambers.

As an example, the modification of a power plant using the process is described. Large, modern, steam power plants are designed for very high efficiency. The steam fed to the turbine is expanded through several stages, finally ending as a very low pressure vapor. This is condensed by cooling water; and the condensate is returned to the steam boiler. On its way, the condensate collects heat from the steam at several stages in the turbine and is reintroduced hot to the boiler.

However, there is an appreciable amount of the heat taken away by the cooling water which could be saved and redirected to some useful purpose, perhaps to reduce the fuel needed in the power plant operation or to increase the power produced or to serve as a heat source for some other process. How this may be done is explained with reference to the accompanying figures.

BRIEF DESCRIPTION OF THE DRAWING

A preferred embodiment of the invention has been chosen for purposes of illustration and description and is shown in the accompanying drawing, forming a part of the specification, wherein.

DESCRIPTION OF THE PREFERRED EMBODIMENT

Figure 1:
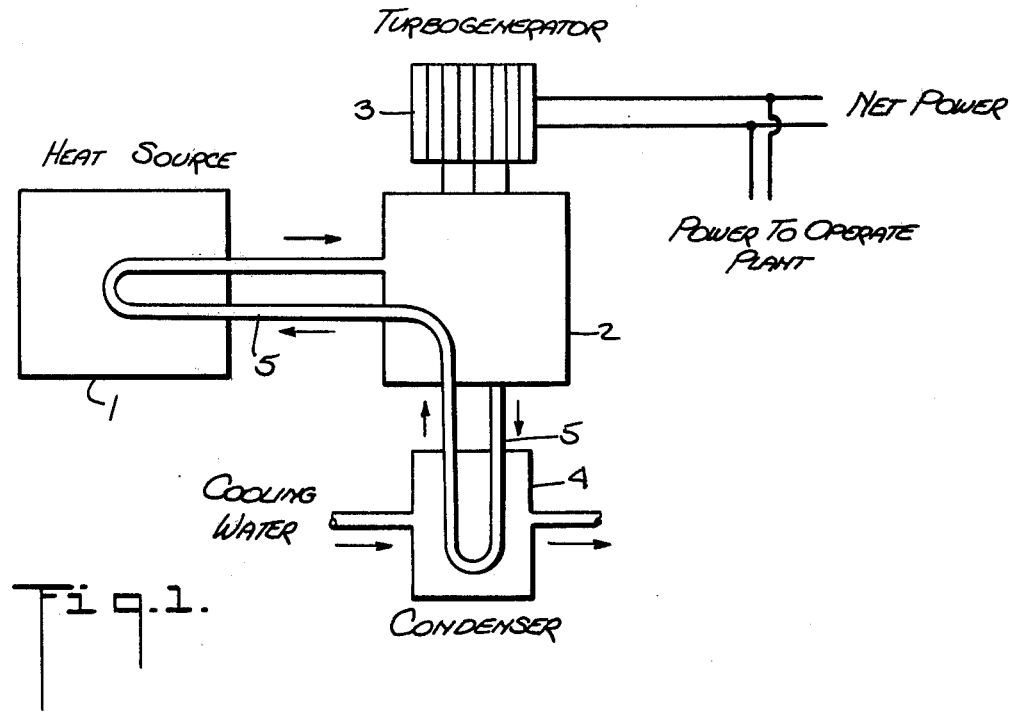
FIG. 1 is a simplified schematic diagram of a conventional power plant.

FIG. 1 is a schematic diagram of a conventional power plant. Boiler water in a water-steam circuit 5 is converted into steam by the heat source 1. The steam operates a turbine 2 which drives an electric generator 3 and the exhausted steam is condensed by cooling water in condenser 4. The steam condensate is routed back to the heat source, recovering heat from the turbine 2 on its way.

Figure 2:
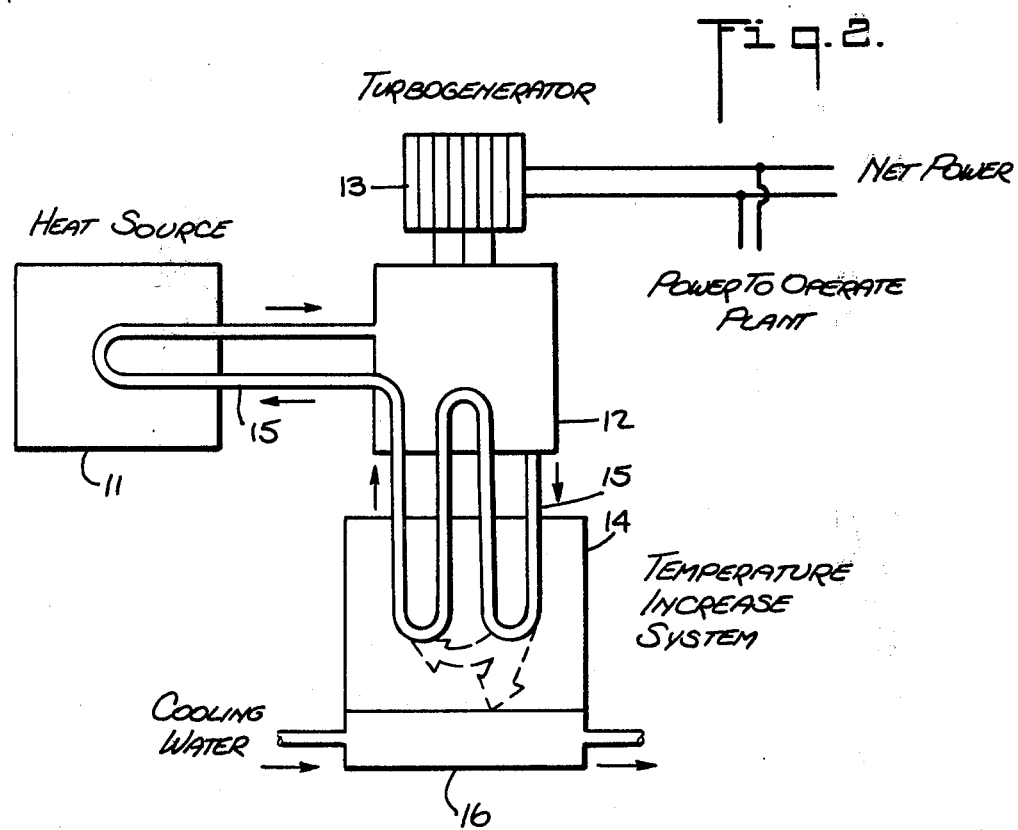
FIG. 2 is a schematic diagram of a power plant system including a temperature increase system.

FIG. 2 represents a similar system in which the returning condensate in water-steam circuit 15 recovers heat not only from the turbine 12 but also from a "Temperature Increase System" (TIS) 14. The TIS 14 condenses the cool vapor exhausted from the turbine 12, collects the heat of condensation, releases part of that heat (upgraded heat) at a higher temperature to be used to heat the condensate in 15 from the boiler steam, and discharges the remaining heat to the cooling water in heat exchanger 16. The TIS also serves the same function as the conventional condenser in maintaining a vacuum for the vapor train of the turbine.

Figure 3:
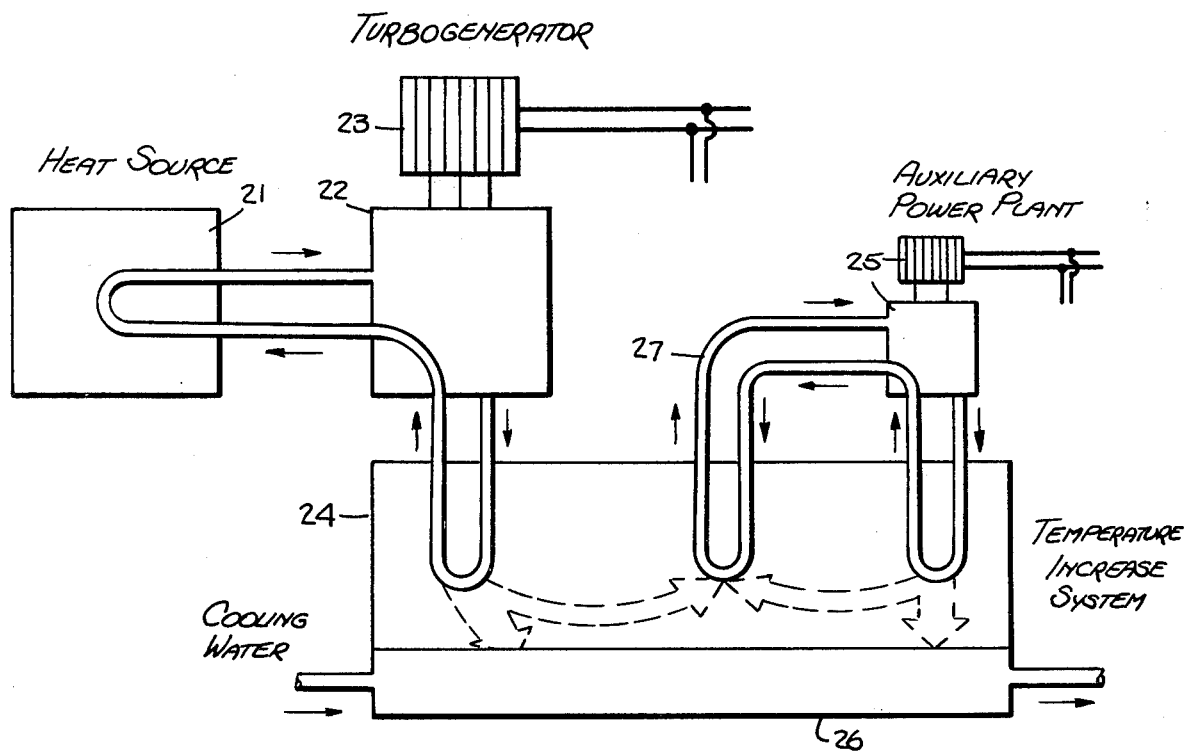
FIG. 3 is a schematic diagram of a power plant with another embodiment of a temperature increase system.

The system of FIG. 3 also includes a TIS 24. In this case, the upgraded heat from the primary power plant 21, 22, 23 is used to make steam in water-steam circuit 27 to operate an auxiliary power plant 25. The exhaust steam of the auxiliary plant 25 is also cycled through the TIS 24.

Figure 4:
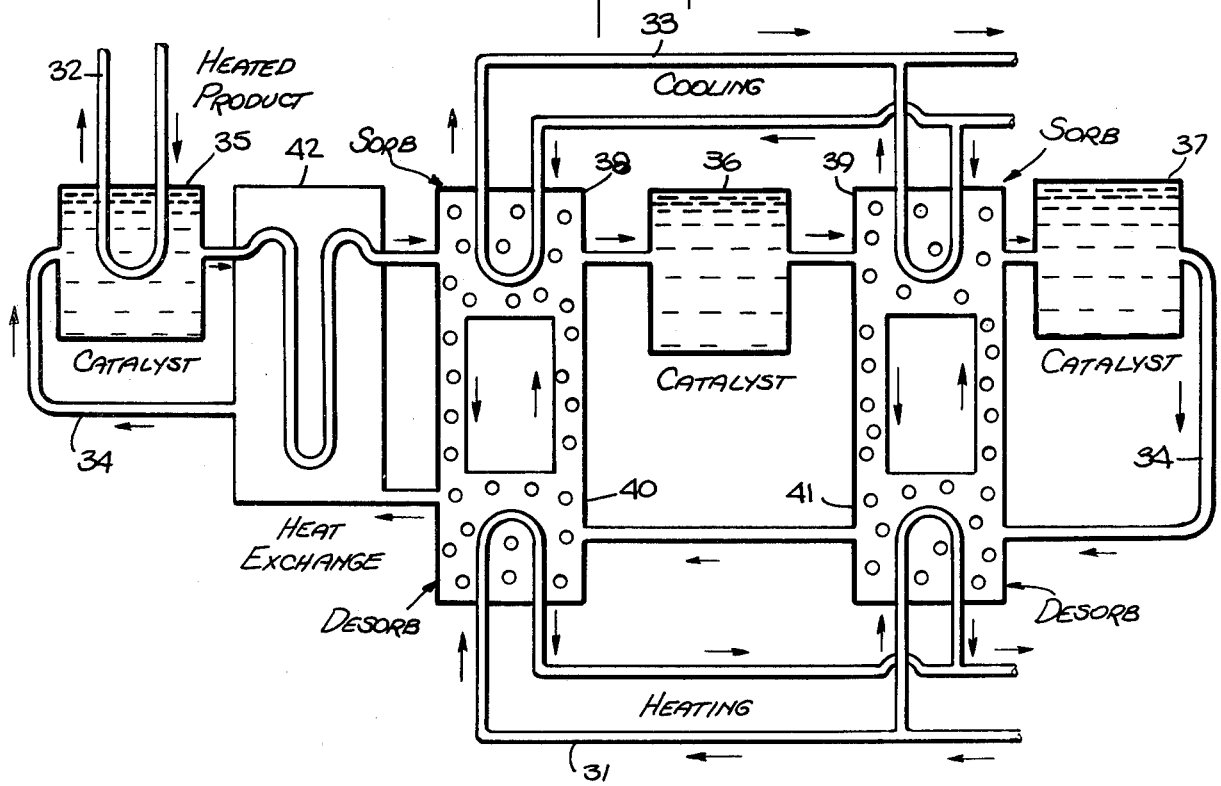
FIG. 4 is a schematic diagram of a preferred embodiment of a temperature increase system.

FIG. 4 illustrates diagrammatically a simplified TIS. It is a closed system with three thermal interfaces with outside sytems: a low-grade heat (relatively low temperature) input 31, an output interface 32 for upgraded heat and a cooling interface 33 to remove the remainder of the heat. For a steam power plant, the low-grade heat input 31 would be provided by condensation of the turbine exhaust low-temperature vapor. The upgraded heat output 32 would heat boiler condensate. Heat would be removed by cooling water flowing through "COOLING" tubes 33.

Chemical reactants circulate through the closed system 34; which includes catalyst chambers 35, 36 and 37, sorption chambers 38 and 39, desorption chambers 40 and 41, heat exchanger 42, and various connecting passages. A typical reaction is $A+B \rightleftarrows C+D+$ heat, which maintains substantial amounts of all four species at equilibrium, but which progresses very slowly except in the presence of a catalyst. Clockwise from the left of the diagram, in the extreme left catalyst chamber 35, the reactants $A+B$ react to make products $C+D$, producing heat which may be withdrawn at a high temperature (upgraded heat) through output interface 32. The mixture approaches equilibrium in the catalyst chamber 35, then proceeds out of the chamber where the reactant stops. The effluent mixture is cooled in heat exhanger 42, transferring heat to preheat the mixture entering the catalyst chamber 35.

The cooled mixture then passes into sorption chamber 38 charged with a sorbent which selectively sorbs one of the reactants B. Cooling is provided from cooling interface 33 to further cool the influent mixture and to remove the heat liberated by the sorption. The B-loaded sorbent is continuously replaced with sorbent from desorption chamber 40 from which B has been desorbed.

From sorption chamber 38 the B-depleted mixture passes into catalyst chamber 36. Because of the low concentration of B, the chemical products $C+D$ react to make the reactants $A+B$, absorbing heat and cooling the mixture still further. The mixture flows on to another sorption chamber 39 and thence another catalyst chamber 37, further converting $C+D$ to $A+B$; and then on to more sorption-catalyst sequences if necessary.

After leaving the catalyst chamber 37 at the extreme right of the diagram, the chemical reactant mixture circulates through the B-enriched sorbent in desorption chamber 41. The sorbent is heated from low-grade heat input 31 and releases the B to the mixture passing through. Leaving desorption chamber 41, the mixture continues to desorption chamber 40 in which the sorbent is heated by heat input 31 and releases still more B to the mixture passing through. The mixture, now rich in A and B, continues its cycle through the preheating heat exchanger 42 back to the high temperature catalyst chamber 35 to be recycled.

In the cycle, the reaction $A+B \rightarrow C+D$ releases heat at a high temperature, and the reverse reaction $C+D \rightarrow A+B$ absorbs heat at a lower temperature. Heat at a low temperature is furnished in great enough abundance to replace the upgraded heat and to replace the heat removed by the cooling needed to sorb B from the mixture.

An example of a reaction for use in the TIS would be the hydrolysis of ethyl acetate:

Ethyl acetate + water $\rightleftarrows$ Ethanol + acetic acid. This reaction, left to right, releases about 63 Btu per pound at 300° F. If equimolar amounts of ethyl acetate and water are reacted, equilibrium will yield about two parts reactants to one part products. The reaction is very slow unless catalyzed. Many catalysts are known, among them several acids including acids fixed on solid particles such as ion-exchange resins.

Sorption of water from the mixture could be used to reverse the reaction. Many sorbents are known, including such abundant commodities as activated alumina and silica gel.

The ethyl acetate hydrolysis and water sorption combination is not necessarily the system of choice. Other chemical systems may be used; among esters along there are dozens of reactions. In some esterification reactions heat may be released in esterification and absorbed in hydrolysis, the opposite of the ethyl acetate system.

Representative catalysts for the ethyl acetate and water reaction are: cation-exhange resin hydrogen form, sulphuric acid, hydrochloric acid, perchloric acid, nitric acid.

Other examples include polymerization ractions, synthesis reactions, and reactions in which, like esterification, the reactants change parts with each other. A specific synthesis reaction is the formation of ammonia from its elements:

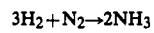

$3H_2 + N_2 \rightarrow 2NH_3$

This reaction is appropriate as an example because the heat of reaction is large, the thermodynamic properties of the reactants are well known, separation of reactants from product is uncomplicated, the uncatalyzed reaction is very slow at the process temperatures, and catalysis of the reaction is well-known. The ammonia synthesis reaction currently needs to be employed at high temperatures, since catalysts have not been developed at lower temperatures.

Representative catalysts for the ammonia reaction include: finely divided iron, finely divided multi-component iron (with small amounts of some of the following: aluminum, zirconium, silicon, titanium, and potassium oxide), finely divided osmium, finely divided multi-component osmium, finely divided uranium, finely divided uranium carbide, finely divided molybdenum-nickel alloy, finely divided multi-component molybdenum nickel. The multi-component catalysts do not necessarily have the same trace materials as those listed for multi-component iron.

Various other means of separating out reactants and products could be employed such as distillation, freezing, precipitation, extraction, centrifugation and reactions with other materials. The sorption-desorption cycle may be implemented in chromatographic techniques.

Many other variations in implementing the principle described are possible. Hot water or steam generated in the system would not need to be used directly for power; it could, for example, be used to charge boilers making high pressure steam for other purposes, thereby saving much fuel. Water evaporation or air instead of cool water might be used for cooling. The heat salvaged might come directly from hot solids, condensation of vapors, hot gases, or heat exchangers passing hot process fluids. The release of the heat from the exothermic reaction in the TIS could be at a high enough temperature so that catalysis is unnecessary.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. The method of increasing the temperature of heat content of a first fluid or solid by accumulating heat in an endothermic chemical reaction from a second fluid or solid at lower temperatures $T_1$ and releasing the heat at temperatures $T_2$ higher than temperatures $T_1$ in the reverse exothermic chemical reaction to heat the first fluid or solid and thereby increase its temperature or heat content, there being a partial separation of reactants from products of the chemical reaction providing one fraction with a concentration of reactants significantly greater than the equilibrium concentration of reactants thereby enabling the chemical reaction to proceed with absorption of heat, and there being a second fraction with a concentration of products significantly greater than the equilibrium concentration of products thereby enabling the reverse chemical reaction to proceed with release of heat.

2. The method of claim 1 in which the heat accumulated is absorbed to a catalyzed chemical reaction.

3. The method of claim 1 in which the heat released is released from a catalyzed chemical reaction.

4. The method of claim 1 in which the separation of reactants from products is by sorption-desorption.

5. The method of claim 1 in which the separation of reactants from products is by distillation.

6. The method of claim 1 in which the separation of reactants from products is by freezing and melting.

7. The method of claim 1 in which the separation of reactants from products is by precipitation.

8. The method of claim 1 in which the separation of reactants from products is by extraction.

9. The method of claim 1 in which the separation of reactants from products is by centrifugation.

10. The method of claim 1 in which the separation of reactants from products is by reactions with other materials.

* * * * *

UNITED STATES PATENT AND TRADEMARK OFFICE
CERTIFICATE OF CORRECTION

PATENT NO. : 4,161,210

DATED : July 17, 1979

INVENTOR(S) : Allen F. Reid et al.

It is certified that error appears in the above-identified patent and that said Letters Patent are hereby corrected as shown below:

Claim 1, line 1, after "temperature" change "of" to read -- or --.

Signed and Sealed this

Sixteenth Day of October 1979

[SEAL]

Attest:

RUTH C. MASON
Attesting Officer

LUTRELLE F. PARKER
Acting Commissioner of Patents and Trademarks